(12) United States Patent
Dries et al.

(10) Patent No.: US 8,962,142 B2
(45) Date of Patent: Feb. 24, 2015

(54) POLYISOCYANATE-BASED ANTI-CORROSION COATING

(75) Inventors: Geert Lodewijk Dries, Zonhoven (BE); Thorsten Gurke, Ruppichteroth (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/808,266

(22) PCT Filed: Jun. 30, 2011

(86) PCT No.: PCT/EP2011/060982
§ 371 (c)(1),
(2), (4) Date: Jan. 4, 2013

(87) PCT Pub. No.: WO2012/004180
PCT Pub. Date: Jan. 12, 2012

(65) Prior Publication Data
US 2013/0115467 A1 May 9, 2013

(30) Foreign Application Priority Data
Jul. 8, 2010 (EP) .................................. 10168903

(51) Int. Cl.
*B32B 27/40* (2006.01)
*C09J 175/04* (2006.01)
*C08L 75/04* (2006.01)

(52) U.S. Cl.
USPC .................... 428/423.1; 428/425.8; 524/590; 427/385.5

(58) Field of Classification Search
USPC ........... 428/425.8, 423.1; 427/385.5; 524/590
See application file for complete search history.

(56) References Cited

U.S. PATENT DOCUMENTS

| | | | |
|---|---|---|---|
| 4,299,924 A | 11/1981 | Nomura et al. | |
| 4,716,210 A | 12/1987 | Trummelmeyer et al. | |
| 5,391,686 A | 2/1995 | Jadhav et al. | |
| 5,534,299 A | 7/1996 | Eisen et al. | |
| 6,387,447 B1 | 5/2002 | Grimm et al. | |
| 6,599,965 B2 | 7/2003 | Lane et al. | |
| 6,699,528 B2 | 3/2004 | McKeand | |
| 2003/0139561 A1 | 7/2003 | Schwindt et al. | |
| 2006/0084777 A1 | 4/2006 | Bleys et al. | |
| 2008/0227929 A1 | 9/2008 | Jozef et al. | |
| 2008/0262168 A1 | 10/2008 | Bleys et al. | |
| 2009/0239998 A1 | 9/2009 | Asahina et al. | |
| 2010/0136346 A1 | 6/2010 | Gurke et al. | |
| 2010/0159144 A1 | 6/2010 | Standke et al. | |
| 2010/0292396 A1* | 11/2010 | Binder et al. | 524/590 |
| 2011/0094614 A1 | 4/2011 | Leroy et al. | |

FOREIGN PATENT DOCUMENTS

| | | | |
|---|---|---|---|
| JP | 60/262816 | 12/1985 | |
| WO | WO 96/33816 | 10/1996 | |
| WO | WO 98/08886 | 3/1998 | |
| WO | WO 01/79369 | 10/2001 | |
| WO | WO 2010023060 A1 * | 3/2010 | C08G 18/42 |

* cited by examiner

*Primary Examiner* — Thao T. Tran
(74) *Attorney, Agent, or Firm* — Robert A. Diaz

(57) ABSTRACT

Anti-corrosion coating for metallic substrates obtainable by reacting an organic polyisocyanate with a compound containing isocyanate-reactive hydrogen atoms at an isocyanate index of between 1000 and 5000% in the presence of a trimerisation catalyst.

17 Claims, 2 Drawing Sheets

POLYISOCYANATE-BASED ANTI-CORROSION COATING

CROSS-REFERENCE TO RELATED APPLICATIONS

This application is the National Phase of International Application PCT/EP2011/060982 filed Jun. 30, 2011 which designated the U.S. and which claims priority to European App. Serial No. 10168903.2 filed Jul. 8, 2010. The noted applications are incorporated herein by reference.

FIELD

The present invention relates to polyisocyanurate (PIR) reactive compositions that are eminently suitable for corrosion-inhibiting, wear-resistant coatings applied by casting or spraying onto metal surfaces and moldings and for lining the interior of tubes.

BACKGROUND INFORMATION

To protect oil and gas pipelines, and also the ballast tanks of ships, from corrosion, coatings are to be provided that withstand cathodic protection.

Unless stainless steel or certain marine bronzes are used to manufacture such metal articles, corrosion, with its associated aesthetic problems and failure modes can be expected to severely limit product lifetime. Even when these two relatively corrosion-resistant classes of materials are used, corrosion may still take place, particularly in salt water or brackish environment. Corrosion problems are most severe when more active metals such as magnesium, aluminum, and carbon steel are used. Such items may become severely corroded over relatively short periods of time.

To lessen the corrosive effects on metals, it has been common to provide surface treatments. Chrome and nickel plating have been used, for example. However, plating is relatively expensive, particularly when large fabricated structures constructed by welding are to be plated. In addition, such plating procedures do not work well on many active metals such as aluminum.

Anodizing has also been used to increase corrosion resistance, and is effectively used on small parts. However, large tubular structures are typically welded together. The anodized coating is destroyed locally during the welding process. Anodizing very large, prefabricated structures is not cost-effective.

Several coating systems to provide corrosion resistance have been proposed in the prior art.

Performance properties such as sandability, recoatability and corrosion resistance are particularly important for coating compositions intended for use as primers over steel substrates. However, it has been difficult for the prior art to obtain the proper balance with regard to sandability, recoatability, corrosion resistance, and metal adhesion requirements.

Failure to provide adequate corrosion resistance or salt spray resistance typically manifests as "scribe creep". "Scripe creep" refers to the degree of corrosion and/or loss of adhesion which occurs along and underneath film adjacent to a scribe made in a cured film after the scribed film has been placed in a salt spray test apparatus. The scribe generally extends down through the film to the underlying metal substrate. As used herein, both corrosion resistance and salt spray resistance refer to the ability of a cured film to stop the progression of corrosion and/or loss of adhesion along a scribe line placed in a salt spray test apparatus for a specified time. Cured films that fail to provide adequate salt spray resistance are vulnerable to large scale film damage and/or loss of adhesion as a result of small or initially minor chips, cuts and scratches to the film and subsequent exposure to outdoor weathering elements.

Coal tar enamels, asphalt, and epoxy coal tar paints have previously been used as anti-corrosive coating compositions. These coating compositions have a number of drawbacks, inter alia, they are poor in low temperature characteristics such as curability, brittleness, impact resistance and flexibility. For example, epoxy coal tar paints, while having good adhesion properties, have poor coating efficiency and abrasion resistance because cure time is extensive thereby hindering the application of relatively thick coatings.

Fusion bonded epoxide (FBE) systems, applied as a primer (optionally 2 coats) are known for coating pipelines. Here the powder is reacted on the hot pipe. The FBE coating is coated with polyethylene/polypropylene (PE/PP) by the sintering process.

A disadvantage of the prior art is that the FBE coatings require substrate temperatures of 180 to 240° C. in order to cure and bond to the metal substrate. This constitutes a high energy cost.

Also FBE cured coatings can withstand operating temperatures of no more than 140° C., which is not sufficient for deep well oil exploration pipelines; the FBE anti-corrosion coating will be damaged at temperatures around 140° C.

Polyurethane coatings for metallic substrates are known, see US 2003/0139561, U.S. Pat. Nos. 5,391,686, 4,716,210, WO 02/051949, U.S. Pat. No. 6,699,528, WO 96/33816 and WO 01/79369.

Two-component mixtures, a polyol component and a polyisocyanate component, are generally reacted at an isocyanate index of between 80 and 150% to form the coating.

U.S. Pat. No. 6,387,447 and WO 2010/003788 describe syntactic thermal insulating coatings for pipes employed in the offshore sector. These coatings are obtained by reacting a polyisocyanate with an isocyanate-reactive compound in the presence of hollow objects.

Although polyurethane coatings have been known to be useful as primers, they have not achieved the desired balance of properties.

In particular, for polyurethane films to provide desirable corrosion resistance, they have typically relied upon the use of corrosion protection components containing heavy metal pigments such as strontium chromate, lead silica chromate, and the like. Unfortunately, sanding such a film produces dust that is environmentally disfavored due to the presence of the heavy metal containing pigments. Accordingly, it would be advantageous to provide a coating which can provide adequate corrosion resistance but which is substantially free of any heavy metal containing pigments.

Further the rigid polyurethane foams which are customarily used today are designed for continuous operating temperatures of up to 130° C. with short peaks of up to 140° C. This is adequate for most Western European district heating networks. Eastern European power stations, however, supply substantially higher flow temperatures, which may reach 200° C. The rigid polyurethane foam which is customarily used is not suitable for such temperature ranges.

SUMMARY

None of the above cited references disclose formulations which provide coatings which exhibit superior corrosion properties, fast cure ratio, good adhesion, adequate flexibility, low moisture transmission, high thermal stability and no delamination when applied to a substrate.

Accordingly, it is an object of the invention to provide a curable coating composition that can be applied directly to a metal substrate and provides a commercially acceptable level of corrosion resistance.

In accordance with the present invention there has been provided a novel composition which is useful for coating various substrates, and particularly when applied as coating to metallic surfaces impart thereto a high degree of corrosion prevention.

BRIEF DESCRIPTION OF THE DRAWINGS

A full understanding of the invention can be gained from the following description of certain embodiments of the invention when read in conjunction with the accompanying drawings which.

DETAILED DESCRIPTION OF THE INVENTION

Figure 1:
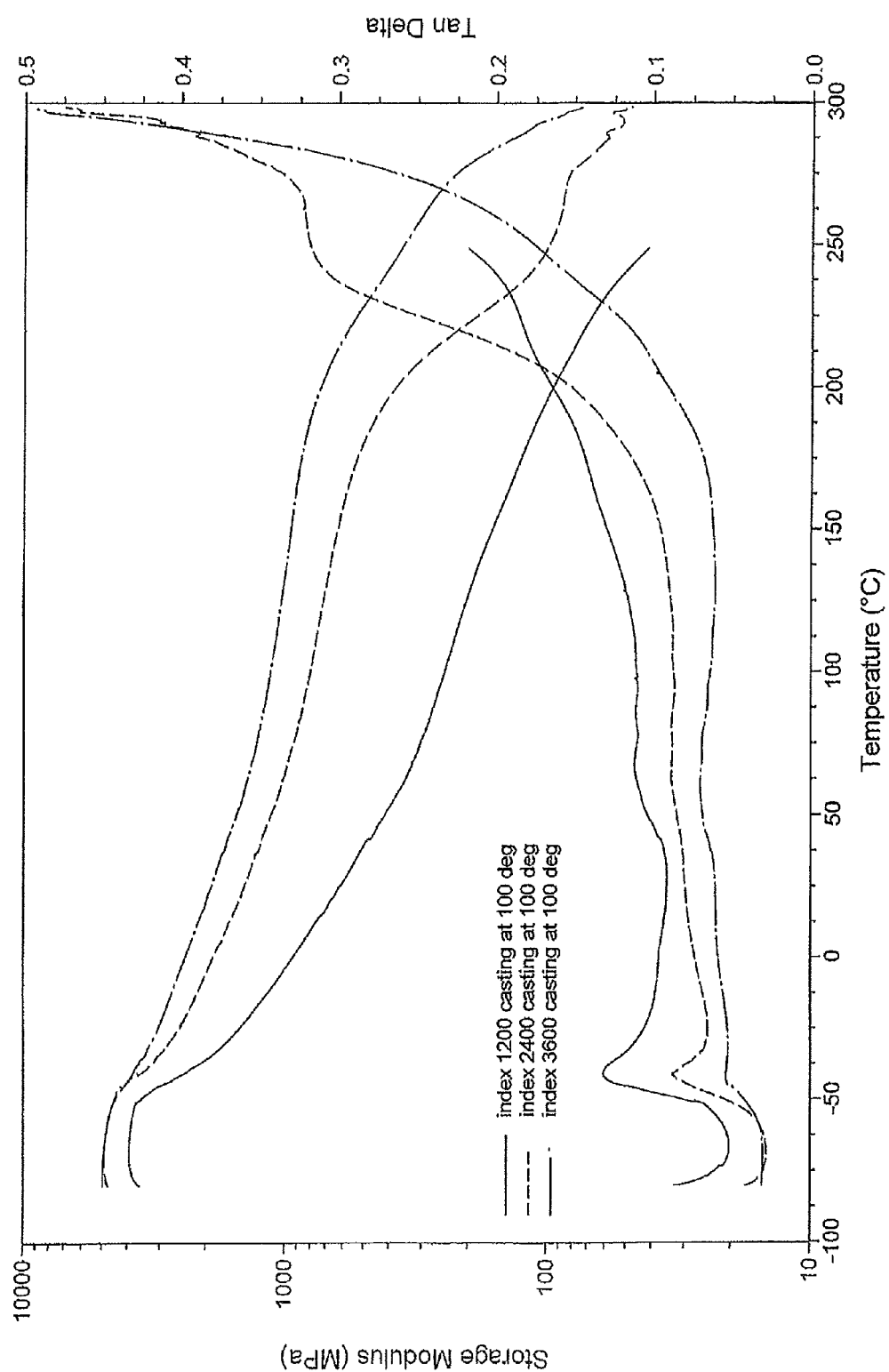
FIG. 1 represents the Dynamic Mechanical Thermal Analysis data measured on samples 2, 3 and 4 (Example 1) according to Standard ASTM D 4065.

Also provided in accordance with the present invention is a method for inhibiting corrosion of metal substrates comprising coating the substrates with the novel compositions of this invention.

The present invention provides a non-syntactic polyisocyanate based coating, which coating is characterised in that it is prepared by reacting an organic polyisocyanate with a compound containing isocyanate-reactive hydrogen atoms at an isocyanate index of more than 1000% in the presence of a trimerisation catalyst.

The polyisocyanurate compositions of this invention, when applied as a coating to metallic substrates provide excellent corrosion inhibition, cure fast at slightly elevated temperature, are suitable for high temperature service, show excellent adhesion and flexibility, exhibit very good impact resistance, show low moisture vapor transmission and also show minimum cathodic disbonding, i.e. delamination due to corrosion.

Commercially acceptable corrosion resistance means achieving cathodic disbondment (CD) test results below 8 mm at 23° C. and 28 days (measured according to standard DIN EN 10290).

In particular compared to polyurethane (PUR) coatings (wherein the isocyanate index is usually below 150%) the polyisocyanurate (PIR) high index coatings of the present invention provide improved corrosion resistance and higher thermal stability and hardness. Compared to prior art epoxy coatings the PIR coatings of the present invention provide higher thermal stability and can be cured at much lower temperatures. See the table below.

|  | PUR | EPOXY | PIR |
|---|---|---|---|
| High Temperature Stability ($T_g$) | <90° C. | <140° C. | >150° C. |
| CD performance | --- | +++ | +++ |
| Cure Temperature | RT | 200° C. | 100° C. |
| Hardness | --- | +++ | +++ |
| Elongation | +++ | + | + |

The polyisocyanurate coatings of the present invention generally show an elongation measured as a free film in accordance with standard DIN 53504 of at least 10% and preferably at least 20%. Elongation can be tuned via the isocyanate index and the isocyanate value of the polyisocyanate used in the coating composition. In this respect the lower the NCO value and/or the lower the index the higher the elongation will be.

U.S. Pat. No. 5,534,299 describes a process for insulating pipes comprising applying at least one layer of a polyisocyanurate (PIR) plastic, prepared at an isocyanate index of 300 to 2000, preferably 350 to 900 and then at least one layer of rigid polyurethane foam to a steel pipe.

The PIR layer described in U.S. Pat. No. 5,534,299 has a foamed microcellular structure whereas the PIR coating of the present invention is a non-foamed system thereby keeping the water permeation to a minimum and improving the anticorrosion properties. To this end in the PIR coating composition of the present invention usually water scavengers are used to capture all the water to avoid any foaming taking place.

Isocyanate index or NCO index or index means the ratio of NCO-groups over isocyanate-reactive hydrogen atoms present in the composition, given as a percentage. In other words the NCO index expresses the percentage of isocyanate actually used in a formulation with respect to the amount of isocyanate theoretically required for reacting with the amount of isocyanate-reactive hydrogen used in the formulation. It should be observed that the NCO index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water) present at the actual polymerisation stage are taken into account.

The polymerisation reaction of the present invention is generally carried out at an isocyanate index of 1000 to 10000%, preferably 1200 to 5000%, more preferably 1500 to 4000% and most preferably about 2400%.

The polyisocyanate used in the present invention may comprise any number of polyisocyanates, including but not limited to, toluene diisocyanates (TDI), diphenylmethane diisocyanate (MDI)-type isocyanates, and prepolymers of these isocyanates. Preferably the polyisocyanate has at least two aromatic rings in its structure, and is a liquid product. Polymeric isocyanates having a functionality greater than 2 are preferred.

The diphenylmethane diisocyanate (MDI) used in the present invention can be in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, or any of their derivatives having a urethane, isocyanurate, allophonate, biuret, uretonimine, uretdione and/or iminooxadiazinedione groups and mixtures of the same.

Examples of other suitable polyisocyanates are tolylene diisocyanate (TDI), hexamethylene diisocyanate (HMDI), isophorone diisocyanate (IPDI), butylene diisocyanate, trimethylhexamethylene diisocyanate, di(isocyanatocyclohexyl)

methane, isocyanatomethyl-1,8-octane diisocyanate and tetramethylxylene diisocyanate (TMXDI).

Due to their better miscibility with the isocyanate-reactive composition and their ease of application preferred polyisocyanates for the invention are the semi-prepolymers and prepolymers which may be obtained by reacting polyisocyanates with compounds containing isocyanate-reactive hydrogen atoms. Examples of compounds containing isocyanate-reactive hydrogen atoms include alcohols, glycols or even relatively high molecular weight polyether polyols and polyester polyols, mercaptans, carboxylic acids, amines, urea and amides. Particularly suitable prepolymers are reaction products of polyisocyanates with monohydric or polyhydric alcohols.

The prepolymers are prepared by conventional methods, e.g. by reacting polyhydroxyl compounds which have a molecular weight of from 400 to 5000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. Preferably the polyether polyols are based on propylene oxide, optionally in combination with up to 20 wt % (based on total alkylene oxides) of ethylene oxide.

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebacic acid, and the like can be given.

Preferably the polyol used to prepare the prepolymer is one that leads to improved miscibility between the polyisocyanate and the isocyanate-reactive compound in the final formulation.

In a particularly preferred embodiment of the invention prepolymers are used as the polyisocyanate component having an average functionality of 2.0 to 2.9, preferably 2.2 to 2.5, a maximum viscosity of 6000 mPa s, and an isocyanate content of 6 to 30 wt %, preferably 10 to 26 wt % and most preferably between 16 and 20 wt %.

Best results in terms of cathodic disbondment are obtained using prepolymers with an isocyanate content above 16 wt % and a functionality higher than 2.

The second component in the present coating formulation is an isocyanate-reactive compound. Any of the above mentioned compounds can be used.

Preferably hydrophobic compounds are used as isocyanate-reactive compound. These provide coatings with further improved anticorrosion properties.

Examples of preferred hydrophobic polyols are polyester polyols based on dimer acid (dimerised fatty acids) and polyether polyols based solely on propylene oxide.

High temperature stable coatings with excellent anticorrosion properties are achieved by the present invention without the use of so-called polymer polyols. Such polymer polyols are generally produced by in-situ polymerisation of vinyl monomers, usually either acrylonitrile or mixtures of acrylonitrile and styrene, in a carrier polyol.

The best performance is obtained when both components, the polyisocyanate and the isocyanate-reactive compound are easily miscible with each other. In this respect good miscibility means a clear solution after good mixing.

The third component of the present adhesive formulation is a catalyst that promotes the trimerisation of isocyanates.

As the trimerisation catalyst there can be used all of such known catalysts as tetraalkylammonium hydroxides (e.g. tetramethylammonium hydroxide, tetraethylammonium hydroxide and tetrabutylammonium hydroxide), organic weak acid salts (e.g. tetramethylammonium acetate, tetraethylammonium acetate and tetrabutylammonium acetate), trialkylhydroxyalkylammonium hydroxides (e.g. trimethylhydroxypropylammonium hydroxide, trimethylhydroxyethylammonium hydroxide, triethylhydroxypropylammonium hydroxide and triethylhydroxyethylammonium hydroxide), organic weak acid salts (e.g. trimethylhydroxypropylammonium acetate, trimethylhydroxyethylammonium acetate, triethylhydroxypropylammonium acetate and triethylhydroxyethylammonium acetate), tertiary amines (e.g. triethylamine, triethylenediamine, 1,5-diaza-bicyclo[4.3.0]nonene-5,1,8-diazabicyclo[5.4.0]-undecene-7 and 2,4,6-tris(dimethylaminomethyl)phenol), metal salts of alkylcarboxylic acids (e.g. acetic acid, caproic acid, caprylic acid, octyl acid, myristic acid and naphthenic acid), and the like.

A particularly preferred group of trimerisation catalysts are quaternary ammonium salts and alkali metal salts of carboxylic acids, such as potassium acetate or potassium 2-ethylhexanoate.

The amount of the trimerisation catalyst used is preferably between 0.01 and 0.1 wt % based on the whole formulation. The more catalyst is used, the faster the drytime and hence increased speed of production; however a too high concentration of catalyst will prevent good wetting and hence lead to bad adhesion.

Preferably the catalyst is dissolved in the isocyanate-reactive compound to achieve storage stability.

Known additives from coating technology may optionally be added. Examples include levelling agents, viscosity-controlling additives, (corrosion protection) pigments, fillers, matting agents, UV stabilizers, antioxidants, water scavengers, thixotropic agents, reinforcing agents, plasticizers, surfactants, adhesion promotors (e.g. silanes), defoaming agents and antimicrobial agents. These additives may be introduced in amounts ranging from 0.01 to 25% by weight of the total composition.

Since the coating of the present invention is a non-syntactic coating hollow particles are generally not added to the reaction mixture.

The polyisocyanate, the isocyanate-reactive compound and the trimerisation catalyst and optional other additives are compounded and the mixture is applied, for example, as coating on an substrate.

The weight ratio between the polyisocyanate and the isocyanate-reactive material is generally between 1/1 and 10/1 and preferably between 1/1 and 4/1.

The compositions of the present invention may be useful for coating a variety of substrates, and the choice of a particular substrate is not considered critical, per se, to the invention and generally includes any substrate where coating materials are routinely applied to inhibit or prevent damage due to transportation, installation, weathering and associated damage sources. These substrates include, but are not limited to metallic substrates, cementitious structures, natural wood substrates or wood by-product substrates and other similar substrates.

While the composition of the invention finds particular applicability as corrosion inhibiting coating for metallic substrates such as, e.g., ferrous pipes, it may also be advantageously applied to other metal-containing substrates such as semi-porous cementitious substrates which encase metallic elements such as metal reinforcement.

The compositions of this invention may be applied to substrates to form a coating thereon by a variety of techniques including, but not limited to, casting, spraying, brushing, dipping, liquid extrusion coating or liquid ribbon coating. These and other application techniques are well known to those skilled in the art.

The process involves coating articles with the coating composition at elevated temperatures, preferably above 60° C., more preferably above 80° C. and most preferably around 100° C., and allowing the coating to cure to a corrosion-resistant film.

As an applicator of a coating composition according to the present invention there can be mentioned known applicators such as airless spray machine, air spray machine, immersion, roll coater, brush and the like.

The various aspects of this invention are illustrated, but not limited by the following examples.

In these examples the following ingredients were used:
Polyol 1: a glycerol initiated polyether polyol of MW 6000, OH value below 35 mg KOH/g with 15% EO-tip
Polyol 2: a glycerol initiated polyether polyol of MW 4800, OH value of 35 mg KOH/g with 17% EO-tip
Additive 1: molecular sieves of 3 Å
Catalyst 1: quaternary ammonium salt trimerisation catalyst
Catalyst 2: triethylenetriamine gellation catalyst
Catalyst 3: potassium acetate trimerisation catalyst
Additive 2: siloxane defoaming agent
DEG: diethylene glycol
HD: hexanediol
Iso 1: a polymeric MDI based prepolymer of functionality 2.2 and NCOv of 19.3%
Iso 2: a polymeric MDI based prepolymer of functionality 2.2 and NCO value 27.4 wt %
Iso 3: an MDI based prepolymer of functionality 2.1 and NCO value 26 wt %
Iso 4: an MDI based prepolymer of functionality 2.0 and NCO value 6.5 wt %
Iso 5: an MDI based prepolymer of functionality 2.0 and NCO value 10 wt %
Iso 6: an MDI based uretonimine variant of functionality 2.13 and NCO value 29.7 wt %
Iso 7: an MDI based uretonimine containing prepolymer of functionality 2.1 and NCO value 24.5 wt %

EXAMPLE 1

Polyisocyanurate formulations containing the ingredients mentioned below in Table 1 (amounts are indicated in pbw) were used to produce coatings.

The coating was applied via a two component dispensing machine equipped with a static mixer and cast or sprayed onto a metal substrate which was freshly sandblasted to SA 2½ and with an average surface roughness of minimum 100 micron. The metal substrate was preheated to 100° C. prior to the coating application. Thereafter the coated sample was put into a heated oven at 100° C. for 15 minutes.

TABLE 1

|  | Sample 1 | Sample 2 | Sample 3 | Sample 4 | Sample 5 |
| --- | --- | --- | --- | --- | --- |
| Polyol 1 | 96.3 | 96.3 | 96.3 | 96.3 | 96.3 |
| Additive 1 | 3.0 | 3.0 | 3.0 | 3.0 | 3.0 |
| Catalyst 1 | 0.2 | 0.2 | 0.2 | 0.2 | 0.2 |
| Additive 2 | 0.5 | 0.5 | 0.5 | 0.5 | 0.5 |
| Iso 1 | 15 | 150 | 300 | 480 |  |
| Iso 2 |  |  |  |  | 220 |
| NCO index | 110 | 1200 | 2400 | 3600 | 2400 |
| Cathodic Disbondment (mm) | >20 | 2 | 3 | 4 | 4 |

The cathodic disbonding of the obtained coatings was measured according to DIN EN 10290 (28 days/23° C.); the results are presented in Table 1.

These results show that only for coatings reacted at an index of more than 1000 (samples 2 to 5) acceptable corrosion resistance is obtained.

Further the glass transition temperature ($T_g$) of each of the coatings was measured according to standard ASTM D 4065 (1992) on a universal V3.8B TA instrument. The results are presented in FIG. 1. Systems according to the present invention do not show a substantial drop in modulus at temperatures above 150° C.

EXAMPLE 2

Polyisocyanurate formulations containing the ingredients mentioned below in Table 2 (amounts are indicated in pbw) were used to produce coatings in the same way as described above in example 1.

Figure 2:
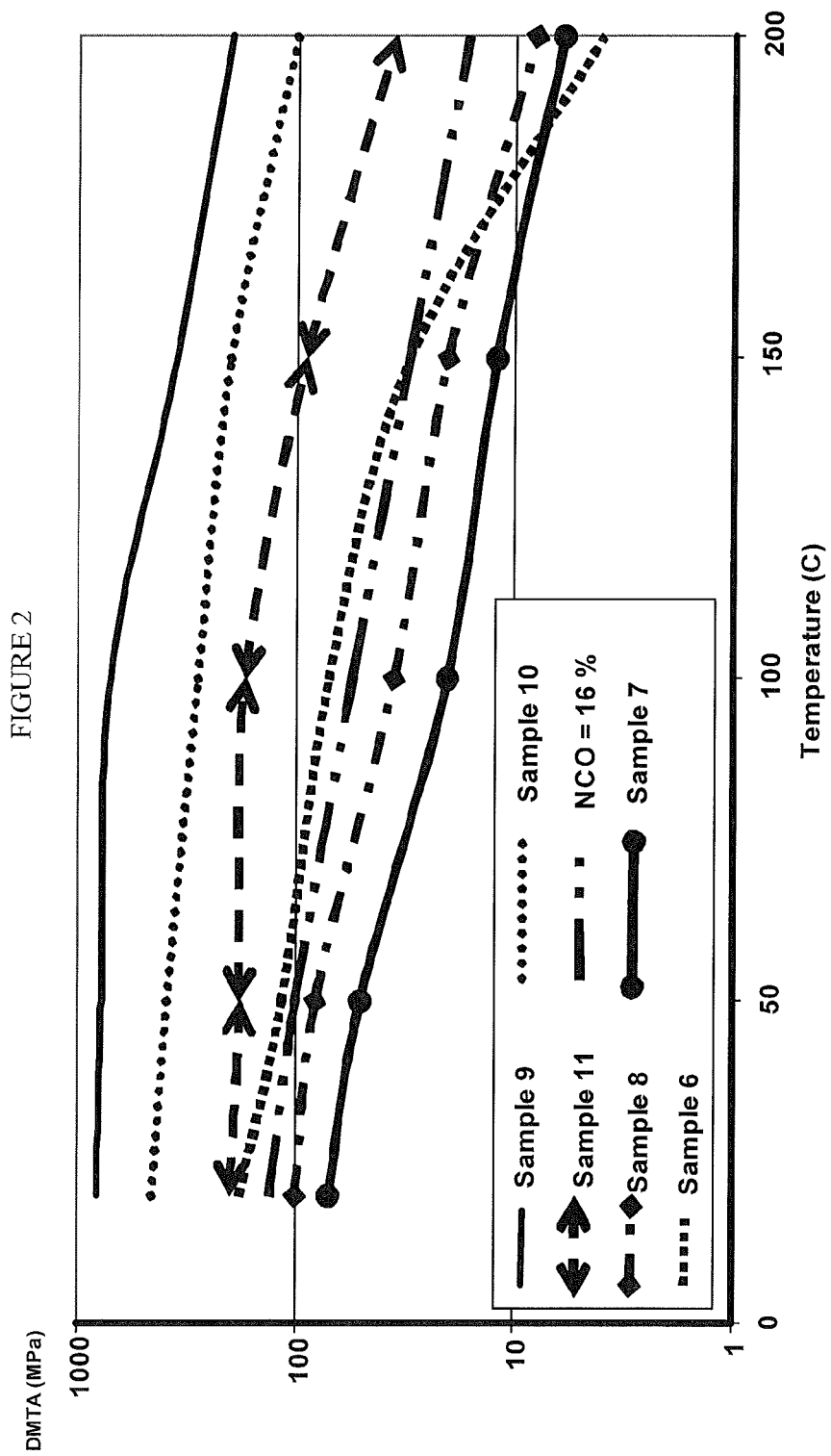
FIG. 2 represents the Dynamic Mechanical Thermal Analysis data measured on samples 6 to 11 (Example 2).

$T_g$ of the produced coatings was measured as per example 1. The results are also presented in Table 2 and schematically in FIG. 2.

Standard polyurethane coatings with an index below 1000 (samples 6 to 8) show a severe drop in modulus at temperatures above 150° C., this contrary to PIR coatings of the present invention (samples 9 to 11).

TABLE 2

|  | Sample 6 | Sample 7 | Sample 8 | Sample 9 | Sample 10 | Sample 11 |
| --- | --- | --- | --- | --- | --- | --- |
| Polyol 1 |  | 94.3 | 94.3 | 94.3 | 94.3 | 94.3 |
| Polyol 2 | 85 |  |  |  |  |  |
| Additive 1 | 3 | 3 | 3 | 3 | 3 | 3 |
| Catalyst 2 | 1.5 |  |  |  |  |  |
| Catalyst 3 | 0.1 | 0.1 | 0.1 | 0.1 | 0.1 | 0.1 |
| Additive 2 | 0.6 | 0.5 | 0.5 | 0.5 | 0.5 | 0.5 |
| DEG | 9.8 |  |  |  |  |  |
| HD |  | 2.1 | 2.1 | 2.1 | 2.1 | 2.1 |
| Iso 3 | 50 |  |  |  |  |  |
| Iso 4 |  | 100 |  |  |  |  |
| Iso 5 |  |  | 100 |  |  |  |
| Iso 6 |  |  |  | 100 |  |  |
| Iso 7 |  |  |  |  | 100 |  |
| Iso 1 |  |  |  |  |  | 150 |
| INDEX | 110 | 275 | 400 | 1200 | 1000 | 1200 |
| Modulus at 25° C. (Mpa) | 180 | 70 | 100 | 800 | 450 | 1200 |
| Modulus at 200° C. (Mpa) | 4 | 6 | 8 | 200 | 100 | 100 |

The invention claimed is:
1. A polyisocyante based non-syntactic primer coating composition comprising the reaction product of (i) an organic polyisocyanate and (ii) a compound containing isocyanate-reactive hydrogen atoms wherein components (i) and (ii) are reacted at an isocyanate index from about 2400 to 10000% in the presence of a trimerisation catalyst; wherein the organic polyisocyanate is a semi-prepolymer or a prepolymer that is obtained by reacting (a) a polyisocyanate compound with (b) a compound containing isocyanate-reactive hydrogen atoms; and wherein component (ii) and component (b) may be the same or different and are selected from the group consisting of alcohols, glycols, polyether polyols, polyester polyols, mercaptans, amines, urea, and amides.

2. The primer coating composition according to claim 1, wherein the isocyanate content of component (i) is between 6 and 30 wt %.

3. The primer coating composition according to claim 1, wherein the functionality of component (i) is from 2.0 to 2.9.

4. The primer coating composition according to claim 1, wherein component (ii) is hydrophobic.

5. The primer coating composition according to claim 4, wherein component (ii) is a polyether polyol obtained by ring-opening polymerisation of propylene oxide with isocyanate-reactive initiators of functionality 2 to 8 and/or a polyester polyol obtained by reacting a polyhydric alcohol and dimer acid.

6. The primer coating composition according to claim 1, wherein the weight ratio between component (i) and component (ii) is between 1/1 and 10/1.

7. The primer coating composition according to claim 1, wherein the isocyanate index is between 2400 and 5000%.

8. The primer coating composition according to claim 1, wherein the isocyanate index is between 2400 and 4000%.

9. The primer coating composition according to claim 1, wherein the isocyanate index is about 2400%.

10. The primer coating composition according to claim 1, wherein the isocyanate content of component (i) is between 10 and 26 wt %.

11. The primer coating composition according to claim 1, wherein the isocyanate content of component (i) is between 16 and 20 wt %.

12. The primer coating composition according to claim 1, wherein the functionality of component (i) is from 2.2 to 2.5.

13. The primer coating composition according to claim 1, wherein the weight ratio between component (i) and component (ii) is between 1/1 and 4/1.

14. An article comprising a substrate and a film coating adhered thereon wherein the film coating comprises the primer coating composition as defined in claim 1.

15. A process for inhibiting corrosion of metallic surfaces comprising applying to the metal surface the reaction mixture of claim 1 and curing it at a temperature of at least 60° C.

16. The process according to claim 15, wherein the curing step is conducted at a temperature of at least 80° C.

17. The process according to claim 15, wherein the curing step is conducted at a temperature of at least 100° C.

* * * * *